(12) United States Patent
Fleming et al.

(10) Patent No.: US 7,140,741 B2
(45) Date of Patent: Nov. 28, 2006

(54) COLOR SHIFTING RETROREFLECTOR AND METHOD OF MAKING SAME

(75) Inventors: Robert J. Fleming, St. Paul, MN (US); Christopher S. Lyons, St. Paul, MN (US); Joseph M. McGrath, Lake Elmo, MN (US); Jesus Ramos, Tucson, AZ (US); Mark A. Roehrig, Stillwater, MN (US); Clark I. Bright, Tucson, AZ (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/024,201

(22) Filed: Dec. 28, 2004

(65) Prior Publication Data

US 2005/0162742 A1 Jul. 28, 2005

Related U.S. Application Data

(60) Provisional application No. 60/533,962, filed on Dec. 30, 2003.

(51) Int. Cl.
*G02B 5/128* (2006.01)

(52) U.S. Cl. ............... 359/536; 359/534; 359/535; 359/537; 428/156; 428/168; 427/256; 427/258

(58) Field of Classification Search ............... 359/515, 359/536, 528–535, 516, 537–553, 517, 518, 359/519–527; 428/156, 158; 427/256, 258
See application file for complete search history.

(56) References Cited

U.S. PATENT DOCUMENTS

| | | |
|---|---|---|
| 1,175,224 A | 3/1916 | Bleecker |
| 2,461,011 A | 2/1949 | Taylor et al. |
| 2,726,161 A | 12/1955 | Beck et al. |
| 2,842,446 A | 7/1958 | Beck et al. |
| 2,853,393 A | 9/1958 | Beck et al. |
| 2,870,030 A | 1/1959 | Stradley et al. |

(Continued)

FOREIGN PATENT DOCUMENTS

WO  WO 97/01776  1/1997

(Continued)

OTHER PUBLICATIONS

Dobrowolski et al., "Reasearch on thin film anticounterfeiting coatings at the National Reasearch Council of Canada," Applied Optics, vol. 28, No. 14, Jul. 15, 1989, pp. 2702-2717, & 2685.

(Continued)

*Primary Examiner*—Euncha P. Cherry
*Assistant Examiner*—Pranav Khatri
(74) *Attorney, Agent, or Firm*—Jay R. Pralle

(57) ABSTRACT

Color shifting retroreflective articles can provide features such as decorative effects, evidence of tampering, security authentication or positional information. In some embodiments, the color shifting retroreflective article includes a layer of microspheres, and a reflective coating that is disposed in optical association with the layer of microspheres. The reflective coating includes a spacer layer disposed between a semitransparent first reflective layer and a second reflective layer. The first reflective layer includes a reflective layer disposed adjacent the layer of microspheres. At least one layer of the reflective coating includes a non-uniform thickness associated with each of a plurality of microspheres such that light incident on the article from a first direction is retroreflected at a first color and light incident on the article from a second direction is retroreflected at a second color visibly different from the first color.

20 Claims, 4 Drawing Sheets

U.S. PATENT DOCUMENTS

| | | |
|---|---|---|
| 2,939,797 A | 6/1960 | Rindone |
| 2,965,921 A | 12/1960 | Bland |
| 2,992,122 A | 7/1961 | Beck et al. |
| 3,468,681 A | 9/1969 | Jaupain |
| 3,700,305 A | 10/1972 | Bingham |
| 3,700,478 A | 10/1972 | Bingham |
| 3,858,977 A | 1/1975 | Baird et al. |
| 3,946,130 A | 3/1976 | Tung et al. |
| 4,082,246 A | 4/1978 | Brown |
| 4,099,838 A | 7/1978 | Cook et al. |
| 4,104,102 A * | 8/1978 | Eagon et al. ............... 156/298 |
| 4,192,576 A | 3/1980 | Tung et al. |
| 4,367,919 A | 1/1983 | Tung et al. |
| 4,564,556 A | 1/1986 | Lange |
| 4,648,932 A | 3/1987 | Bailey |
| 4,722,515 A | 2/1988 | Ham |
| 4,758,469 A | 7/1988 | Lange |
| 4,763,985 A | 8/1988 | Bingham |
| 4,772,511 A | 9/1988 | Wood et al. |
| 4,842,893 A | 6/1989 | Yializis et al. |
| 4,896,943 A | 1/1990 | Tolliver et al. |
| 4,896,943 A | 1/1990 | Tolliver et al. |
| 4,931,414 A | 6/1990 | Wood et al. |
| 4,954,371 A | 9/1990 | Yializis |
| 5,066,098 A | 11/1991 | Kult et al. |
| 5,097,800 A | 3/1992 | Shaw et al. |
| 5,200,262 A | 4/1993 | Li |
| 5,395,644 A | 3/1995 | Affinito |
| 5,784,198 A | 7/1998 | Nagaoka |
| 5,812,317 A | 9/1998 | Billingsley et al. |
| 5,837,347 A | 11/1998 | Marecki |
| 5,877,895 A | 3/1999 | Shaw et al. |
| 5,976,669 A | 11/1999 | Fleming |
| 6,012,647 A | 1/2000 | Ruta et al. |
| 6,024,455 A | 2/2000 | O'Neill et al. |
| 6,045,864 A | 4/2000 | Lyons et al. |
| 6,083,628 A | 7/2000 | Yializis |
| 6,172,810 B1 | 1/2001 | Fleming et al. |
| 6,224,219 B1 * | 5/2001 | Fleming et al. ............. 359/530 |
| 6,243,201 B1 | 6/2001 | Fleming et al. |
| 6,264,747 B1 | 7/2001 | Shaw et al. |
| 6,350,034 B1 | 2/2002 | Fleming et al. |
| 6,355,302 B1 | 3/2002 | Vandenberg et al. |
| 6,416,188 B1 | 7/2002 | Shusta et al. |
| 6,503,564 B1 | 1/2003 | Fleming et al. |
| 6,966,660 B1 * | 11/2005 | Buccellato et al. ......... 359/540 |
| 2001/0028921 A1 | 10/2001 | Shaw et al. |
| 2002/0037364 A1 | 3/2002 | Fleming |

FOREIGN PATENT DOCUMENTS

WO    WO 01/29587    4/2001

OTHER PUBLICATIONS

Simonsis, "The Dawn of a New Age in Coating Technology," Paper Film Foil Converter, Feb. 1998, pp. 51-52, 54, & 56.

Affinito et al., "Vacuum deposited polymer/metal multilayer fibers for optical application", Thin Solid Folms 270, 1995, pp. 43-48.

Dobrowolski et al., "Optical Interference Coatings for Inhibiting Counterfeiting", Opt. Acta, 1973, pp. 925-937.

* cited by examiner

COLOR SHIFTING RETROREFLECTOR AND METHOD OF MAKING SAME

This application claims the benefit of the filing date of copending U.S. Provisional Application Ser. No. 60/533, 962, filed Dec. 30, 2003 and entitled COLOR SHIFTING RETROREFLECTOR AND METHOD OF MAKING SAME.

BACKGROUND

Retroreflective articles have the ability to redirect obliquely incident light back towards the light source. This unique ability has led to the wide-spread use of retroreflective articles on various substrates. For example, retroreflective articles can be used on flat inflexible substrates, such as road signs and barricades; on irregular surfaces, such as corrugated metal truck trailers, license plates, and traffic barriers; and on flexible substrates, such as road worker safety vests, a jogger's shoes, roll up signs, and canvas-sided trucks.

One type of retroreflective article includes beads. Such beaded articles commonly use a multitude of glass or ceramic microspheres to retroreflect incident light. Typically, the microspheres are partially embedded in a support film, and a specular reflecting material is provided between the layer of microspheres and the support film. The reflecting material can be a metal layer (for example, an aluminum coating as disclosed in U.S. Pat. No. 3,700,478 (Bingham '478) and U.S. Pat. No. 4,648,932 (Bailey)), an inorganic dielectric mirror made up of multiple layers of inorganic materials that have different refractive indices (for example as disclosed in U.S. Pat. No. 3,700,305 (Bingham '305) and U.S. Pat. No. 4,763,985 (Bingham '985)) or an organic reflective coating made up of multiple polymer layers that have different refractive indices (for example as disclosed in U.S. Pat. No. 6,172,810 B1 (Fleming et al. '810)).

Categories of beaded retroreflective articles include exposed lens, enclosed lens, and encapsulated lens types. Exposed lens beaded articles have a layer of microspheres, the front sides of which are exposed to the environment. Enclosed lens beaded articles have a protective layer such as a transparent polymer resin contacting and surrounding the front side of the microspheres. Encapsulated lens articles have an air gap surrounding the front side of the microspheres and a transparent film hermetically sealed to a support film to protect the microspheres from water, dirt, or other environmental elements.

Other references involving optical articles include U.S. Pat. No. 5,877,895 (Shaw et al. '895) and U.S. Pat. No. 6,083,628 (Yializis).

SUMMARY

When an untinted retroreflective article is viewed at normal or near-normal observation angles with white light, the retroreflected image usually is also white. When viewed at highly oblique angles near the article's angular limit for retroreflectivity, the image may exhibit some color fringing, an effect normally regarded as undesirable. However, if the retroreflective article is made to exhibit perceptible color shifting at observation angles less than the article's angular limit for retroreflectivity, the resulting color effects can provide useful features including decorative effects, evidence of tampering, security authentication or positional information. For example, the visibility and conspicuity of an object can be enhanced by not only retroreflecting light back to its source, but also by making the color of the retroreflected light dependent on information about the object, such as its orientation to the light source and the object's color shifting properties.

In one aspect, the present disclosure provides a color shifting retroreflective article that includes a layer of microspheres, and a reflective coating disposed in optical association with the layer of microspheres. The reflective coating includes an at least partially transparent spacer layer disposed between a semitransparent first reflective layer and a second reflective layer. The first reflective layer may be disposed, for example, adjacent and between the layer of microspheres and the spacer layer. The second reflective layer may be semitransparent or opaque and may be disposed, for example, adjacent the spacer layer. At least one layer of the reflective coating includes a non-uniform thickness associated with each of a plurality of microspheres such that light incident on the article from a first direction is retroreflected at a first color and light incident on the article from a second direction is retroreflected at a second color visibly different from the first color.

In another aspect, the present disclosure provides a color shifting retroreflective article that includes a layer of microspheres, and a reflective coating that is disposed in optical association with the layer of microspheres. The reflective coating includes a semitransparent first reflective layer adjacent the layer of microspheres. The reflective coating also includes an at least partially transparent spacer layer adjacent the first reflective layer, and a second reflective layer adjacent the spacer layer such that the spacer layer is between the first and second reflective layers. The reflective coating reflects visible light non-uniformly, and a predetermined first area of the reflective coating associated with each microsphere of at least a plurality of microspheres includes a first thickness and a predetermined second area of the reflective coating associated with each microsphere of at least a plurality of microspheres includes a second thickness different from the first thickness.

In one aspect, the present disclosure provides a color shifting retroreflective article that exhibits a visually perceptible change in the color of retroreflected light at observation angles not near the article's angular limit for retroreflectivity.

In another aspect, the present disclosure provides a method for making a color shifting retroreflective article that includes providing a layer of microspheres, and forming a reflective coating in optical association with the layer of microspheres. Forming the reflective coating includes depositing a semitransparent first reflective layer adjacent the layer of microspheres. Forming the reflective coating further includes depositing an at least partially transparent spacer layer on the first reflective layer, and depositing a second reflective layer on the spacer layer. The reflective coating is formed to provide for each of a plurality of microspheres a non-uniform thickness in at least one of the respective layers of the reflective coating such that light incident on the article from a first direction is retroreflected at a first color and light incident on the article from a second direction is retroreflected at a second color visibly different from the first color.

In another aspect, the present disclosure provides a method for making a color shifting retroreflective article that includes providing a layer of microspheres, and forming a reflective coating in optical association with the layer of microspheres. Forming the reflective coating includes depositing a semitransparent first reflective layer adjacent the layer of microspheres. Forming the reflective coating further includes depositing an at least partially transparent spacer layer on the first reflective layer, and depositing a second reflective layer on the spacer layer such that the spacer layer is between the first and second reflective layers.

The reflective coating reflects visible light non-uniformly, where a predetermined first area of the reflective coating associated with each microsphere of at least a plurality of microspheres includes a first thickness and a predetermined second area of the reflective coating associated with each microsphere of the at least a plurality of microspheres includes a second thickness different from the first thickness.

The above summaries are not intended to describe each disclosed embodiment or every implementation of the present invention. The Figures and the Detailed Description that follow more particularly exemplify illustrative embodiments.

DETAILED DESCRIPTION

Figure 1:
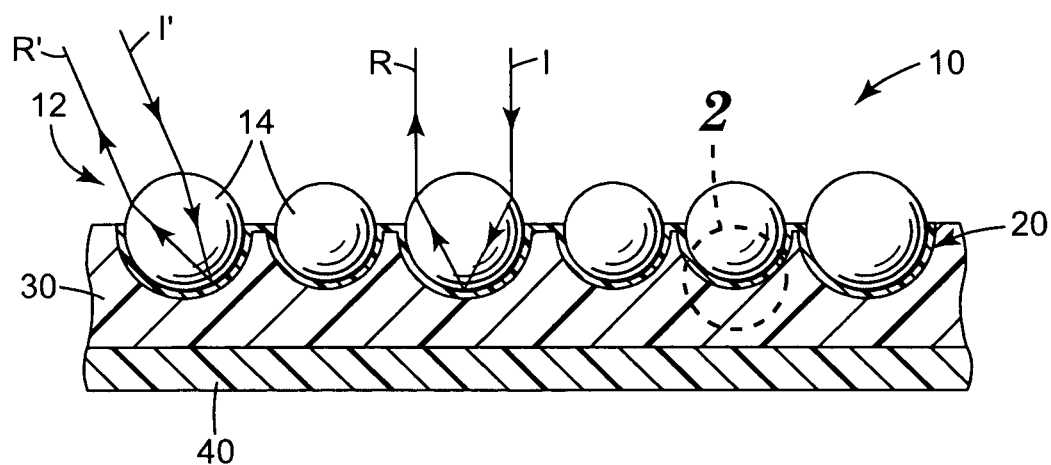
FIG. 1 is a cross-sectional schematic diagram of one embodiment of a portion of a color shifting retroreflective article.

FIG. 1 is a cross-sectional schematic diagram of a portion of one embodiment of a beaded retroreflective article 10. The retroreflective article 10 includes optical elements in the form of a layer of microspheres 12 partially embedded in a binder layer 30. A reflective coating 20 is disposed between the layer of microspheres 12 and the binder layer 30 such that the reflective coating 20 is in optical association with the layer of microspheres 12. As used herein, the term "optical association" refers to the reflective coating 20 being positioned relative to the layer of microspheres 12 such that a significant portion of light transmitted through each microsphere 14 can strike the reflective coating 20 and be reflected back into the microsphere 14. Optional substrate layer 40 can be used to add structural support. The beaded retroreflective article 10 as illustrated in FIG. 1 is typically referred to as an "exposed lens" beaded retroreflective article. An "exposed lens" beaded retroreflective article is one where the optical elements, in this case microspheres 14, are exposed to the ambient environment, namely air. Optionally, a cover layer (not shown) may be disposed over at least a portion of the layer of microspheres 12 opposite the reflective coating 20 such that it covers or encapsulates the exposed portions of the microspheres 14 to make "enclosed lens" or "encapsulated lens" beaded retroreflective articles. Examples of exposed lens articles are described, e.g., in Bingham '478; Bingham '985 and in U.S. Pat. No. 5,812,317 (Billingsley et al.). Examples of encapsulated lens products are described, e.g., in U.S. Pat. No. 4,896,943 (Tolliver et al.); U.S. Pat. No. 5,066,098 (Kult et al.) and U.S. Pat. No. 5,784,198 (Nagaoka).

The microspheres 14 used in a beaded product of the disclosure preferably are substantially spherical in shape to provide uniform and efficient retroreflection. The microspheres 14 preferably also are highly transparent to minimize light absorption so that a large percentage of incident light is retroreflected. The microspheres 14 often are substantially colorless but may be tinted or colored in some other fashion. The microspheres 14 may be made from glass, a non-vitreous ceramic composition, or a synthetic resin. In general, glass and ceramic microspheres are preferred because they tend to be harder and more durable than microspheres made from synthetic resins. Examples of microspheres that may be useful are disclosed in U.S. Pat. No. 1,175,224 (Bleeker); U.S. Pat. No. 2,461,011 (Taylor et al.); U.S. Pat. No. 2,726,161 (Beck et al. '161); U.S. Pat. No. 2,842,446 (Beck et al. '446); U.S. Pat. No. 2,853,393 (Beck et al. '393); U.S. Pat. No. 2,870,030 (Stradley et al.); U.S. Pat. No. 2,939,797 (Rindone); U.S. Pat. No. 2,965,921 (Bland); U.S. Pat. No. 2,992,122 (Beck et al. '122); U.S. Pat. No. 3,468,681 (Jaupain); U.S. Pat. No. 3,946,130 (Tung et al. '130); U.S. Pat. No. 4,192,576 (Tung et al. '576); U.S. Pat. No. 4,367,919 (Tung et al. '919); U.S. Pat. No. 4,564,556 (Lange '556); U.S. Pat. No. 4,758,469 (Lange '469); U.S. Pat. No. 4,772,511 (Wood et al. '511) and U.S. Pat. No. 4,931,414 (Wood et al. '414).

The microspheres 14 typically have an average diameter of about 10 to 500 μm. It may be preferred that the microspheres have an average diameter of about 20 to 250 μm. Microspheres smaller than these ranges tend to provide lower levels of retroreflection, and microspheres larger than these ranges may impart an undesirably rough texture to the retroreflective article 10 or may undesirably reduce its flexibility in embodiments in which such flexibility is a desired property. Microspheres 14 used in the present disclosure typically have a refractive index of about 1.2 to 3.0. It may be preferred that the microspheres 14 have a refractive index of about 1.6 to 2.7. It may be more preferred that the microspheres 14 have a refractive index of about 1.7 to 2.5.

The layer of microspheres 12 is partially embedded in binder layer 30 such that the binder layer 30 is adjacent the reflective coating 20. Binder layer 30 may include any suitable material or materials, e.g., polymers such as acrylics, urethanes, epoxies, rubber, olefins, polyvinyl chloride, ethylene vinylacetate copolymers or polyesters. The binder layer 30 may be formed using any suitable technique as is further described, e.g., in Billingsley et al. '317. In some embodiments, the reflective coating 20 or one of the layers of the reflective coating 20 may act as the binder layer such that a separate binder layer 30 is not included in the article 10.

Figure 2:
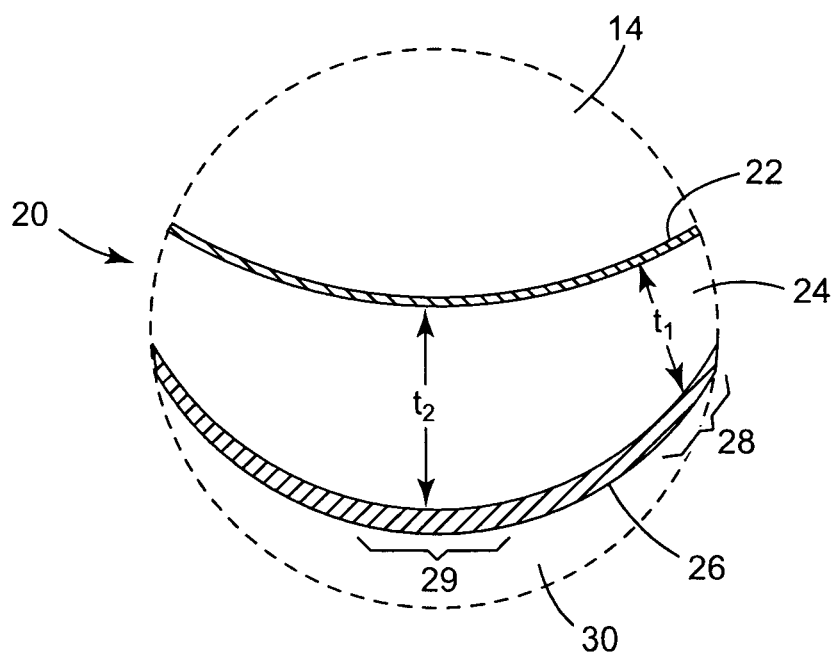
FIG. 2 is an enlarged schematic view of a portion of a microsphere taken from region 2 of FIG. 1.

FIG. 2 shows a magnified view of a portion of the microsphere 14 indicated by region 2 in FIG. 1. Reflective coating 20 includes a first reflective layer 22, a second reflective layer 26, and a transparent spacer layer 24 disposed between the first reflective layer 22 and second reflective layer 26. The first reflective layer 22 may be made, for example from one or more metals in one or more layers and is thin enough to be semitransparent. As used herein, the term "semitransparent" when used with respect to a reflective layer refers to a layer that is partially reflective and partially transmissive for visible light. As used herein, the term "metal" refers to elemental metals and metal alloys. Examples of suitable metals include aluminum, chromium, nickel, nickel-chromium alloy, stainless steel, silver. The first reflective layer 22 may also be a stack of layers each containing one or more inorganic or organic materials, with two or more such layers having refractive indices that differ sufficiently to reflect light. As used herein, the phrase "organic materials" refers to monomers, oligomers and polymers of organic or organometallic materials. Examples of suitable inorganic materials are described, e.g., in Bingham '305 and Bingham '985. Examples of suitable organic materials are described, e.g., in Bingham '305, Bingham '985 and Fleming et al. '810. Thus in some embodiments, the first reflective layer 22 is a single metal layer; in other embodiments, the first reflective layer 22 can include multiple layers. In some embodiments, the first reflective layer 22 is at least 25% transparent. In some embodiments, the first reflective layer 22 is about 50% transparent and 50% reflective. In some embodiments, the first reflective layer 22 has a thickness that is at least about 3 nm. In some embodiments, the first reflective layer 22 has a thickness that is less than about 200 nm.

Although FIG. 2 illustrates the first reflective layer 22 as being positioned on and in contact with the microsphere 14, one or more additional layers may be positioned between the first reflective layer 22 and the layer of microspheres 12. For example, an intermediate layer or layers may be included between the layer of microspheres 12 and the first reflective layer 22 of the reflective coating 20. Such intermediate layers are described, e.g., in Billingsley et al. '317. Such intermediate layers may be used in retroreflective articles to improve the retroreflection optics. Depending on the index of refraction of the microspheres 14, and whether the article is an exposed lens retroreflector or an encapsulated retroreflector, these intermediate layers are on the order of 10 μm thick and can be used to place the reflective coating 20 at the focal point of the microsphere 14.

The second reflective layer 26 may be positioned on the spacer layer 24 opposite the first reflective layer 22. Although FIG. 2 illustrates the second reflective layer 26 as being positioned on and in contact with the spacer layer 24, one or more additional layers may be positioned between the second reflective layer 26 and the spacer layer 24. The second reflective layer 26 may also include any suitable metal or metals, e.g., aluminum, chromium, nickel, nickel-chromium alloy, stainless steel, silver, and may also be formed from a stack of layers each containing one or more inorganic or organic materials, with two or more such layers having refractive indices that differ sufficiently to reflect light. Thus in some embodiments, the second reflective layer 26 includes a single layer; in other embodiments, the second reflective layer 26 may include multiple layers. In some embodiments, the second reflective layer 26 is substantially opaque. In some embodiments, the second reflective layer 26 has a thickness that is at least about 20 nm. In some embodiments, the second reflective layer 26 has a thickness that is less than about 200 nm. In some embodiments, the second reflective layer 26 may also be the binder layer 30.

The first reflective layer 22 and the second reflective layer 26 may be formed or deposited using any suitable technique, e.g., vacuum metallization, sputter coating, evaporation, chemical vapor deposition (CVD), and plasma enhanced CVD. These and other suitable techniques will be familiar to those skilled in the art.

In some embodiments, the color shifting retroreflective article 10 may include one or more additional layers. For example, an adhesion promoter may be provided between the layer of microspheres 12 and the reflective coating 20 as is further described herein. Other exemplary additional layers may contain silane coupling agents for adhesion promotion as is described, e.g., in U.S. Pat. No. 5,976,669 (Fleming).

Disposed between the first reflective layer 22 and the second reflective layer 26 is the spacer layer 24. The spacer layer 24 may include any suitable at least partially transparent material or materials, e.g., inorganic dielectric materials such as metal oxides, nitrides, oxynitrides, carbides, fluorides, and borides; or solid organic materials including molecules, oligomers, and polymers. In some embodiments, the spacer layer 24 can include a dielectric material. In some embodiments, the spacer layer 24 can include a monolithic acrylate polymer. The spacer layer 24 may include one or more layers.

In the embodiment illustrated in FIG. 2, the spacer layer 24 has a non-uniform thickness associated with one or more microspheres 14 in the layer of microspheres 12. The average thickness of the spacer layer 24 can for example be at least about 70 nm. In some embodiments, the spacer layer 24 can have an average thickness that is less than about 1000 nm.

The spacer layer 24 may be formed using any suitable technique, e.g., evaporation, plasma deposition, solution coating, extrusion coating, gravure coating, or spray coating. These and other suitable techniques will be familiar to those skilled in the art. In some embodiments, the spacer layer 24 is formed using flash evaporation as is further described herein.

In some embodiments, at least one layer of the reflective coating 20 includes a non-uniform thickness associated with each microsphere 14 of a plurality of microspheres of the layer of microspheres 12. Such non-uniform thickness enables light incident on the color shifting retroreflective article 10 from a first direction to retroreflect at a first color and light incident on the article 10 from a second direction to retroreflect at a second color visibly different from the first color.

For example, as shown in FIG. 1, incident light I that enters a microsphere 14 from a first direction (which in this case is approximately perpendicular to layer 12) can be refracted toward the center of the microsphere 14, reflected off the reflective coating 20 behind the microsphere 14, and redirected out of the microsphere 14 in the general direction of the incident light, as indicated by reflected light beam R. When the incident light I encounters the front of the reflective coating 20, a portion of the light is reflected by the first reflective layer 22, and another portion passes through the first reflective layer 22 and into the spacer layer 24. At least a portion of the transmitted light is then reflected by the second reflective layer 26 and retransmitted through the spacer layer 24. At least a portion of the retransmitted light passes through the first reflective layer 22, where it may constructively or destructively interfere with the portion of light that was reflected by the first reflective layer 22. As also as shown in FIG. 1, incident light I' that enters a microsphere 14 from a second direction (which in this case is oblique with respect to layer 12 but not near the angular limit for retroreflectivity) can be refracted toward the center of the microsphere 14, reflected off the reflective coating 20 behind the microsphere 14, and redirected out of the microsphere 14 in the general direction of the incident light, as indicated by reflected light beam R'. Incident light I and reflected beam R travel through a different thickness in reflective coating 20 compared to incident light I' and reflected beam R', thereby causing the color of reflected beam R' to differ visibly from the color of reflected beam R. This color effect can be visually perceived at observation angles less than the angular limit for retroreflectivity, e.g., by changing the observation angle from direction I to direction I'.

In the embodiment illustrated in FIGS. 1–2, the spacer layer 24 includes a non-uniform thickness. In some embodiments, the first reflective layer 22 or the second refleclayer 26 may include a non-uniform thickness. In such embodiments, the article may exhibit not only an angular-dependent shift in color but also an angular-dependent shift in the intensity of retroreflected light. In other embodiments, more than one layer of the reflective coating 20 may include a non-uniform thickness. For example, as shown in FIG. 2, the reflective coating 20 may include a first area 28 where the spacer layer 24 has an average thickness t1 as measured along a radial from near the center of the microsphere 14. In a second area 29 of the reflective coating 20, the spacer layer 24 may have an average thickness t2. In the embodiment shown in FIG. 2, thickness t2 is greater than thickness t1.

The thickness of one or more of the layers of the reflective coating 20 may vary in any suitable manner to produce a non-uniform thickness. For example, the thickness may follow a thickness gradient. In the embodiment shown in FIG. 2, spacer layer 24 has a non-uniform thickness variation having a crescent-like cross-sectional shape behind the microsphere 14.

The thickness of the spacer layer 24 may be a small multiple of a quarter wavelength of light for constructive interference (allowing for the index of refraction of the dielectric material). When light is retroreflected through such a spacer layer, light with the appropriate wavelength may have the reflected and transmitted beams in phase for constructive interference. Light of other colors may have at least partial destructive interference. When an article 10 with such a spacer layer 24 is observed at a fixed angle in white light, the article 10 may reflect a strong characteristic color, e.g., blue or green. The spacer layer 24 may also have a thickness such that the article 10 will retroreflect colored light when illuminated at normal incidence with white light. This combination of retroreflection and color may make it easier to perceive the article, and when combined with the disclosed color shifting can make the article and its position or condition much more conspicuous than if the article functioned merely as a diffuse or specular white or colored reflector.

The color reflected from the article 10 can depend on the optical path length of light passing through a microsphere 14 and its respective reflective coating 20. When the article 10 is observed with light at substantially normal incidence (i.e., substantially normal to the layer of microspheres 12 of FIG. 1), a certain color, e.g., green, is seen. As described herein, a portion of light incident substantially normal to the layer of microspheres 12 of article 10 will pass through the first reflective layer 22 and traverse the spacer layer 24 proximate second area 29 of the article 10. In second area 29, the spacer layer has an average thickness t2. The light will, therefore, travel approximately two times thickness t2 before a portion passes back through the first reflective layer 22 and the microsphere 14. When the angle of incidence and reflection from the article 10 is oblique rather than normal, the total optical path length through the reflective coating 20 is shorter in the embodiment illustrated in FIG. 2, because at least a portion of light entering at an oblique angle traverses a reduced thickness region of spacer layer 24 such as the region proximate first area 28 where the spacer layer 24 has an average thickness t1 that is less than thickness t2. Thus, when the article 10 is observed at an oblique angle, a shorter wavelength color, for example, blue, can be observed.

In other words, light incident on the article 10 from a first direction is reflected at a first color and light incident on the article 10 from a second direction is retroreflected at a second color that can be visibly different from the first color. The color shifting retroreflective article 10, therefore, reflects light non-uniformly. It may be preferred that the first direction is substantially normal to the layer of microspheres 12. Further, it may be preferred that the first and second direction differ by at least 10°. It may be more preferred that the first and second direction differ by at least 30°.

In general, color may be measured using the CIE 1931 Standard Colorimetric System. This system uses a two-dimensional diagram that includes points specified by chromaticity coordinates (x,y), which represent the chromaticities of color stimuli in the CIE color matching system. The color of an article or region of an article can be specified by a point (x,y) or region (expressed in terms of more than one chromaticity coordinate (x,y)) on the CIE chromaticity diagram (see, e.g., FIG. 4). The first and second colors reflected by the color shifting retroreflective article 10 can be characterized by CIE chromaticity coordinates (x1y1), (x2y2), respectively. It maybe preferred that the greater of |x2−x1| and |y2−y1| is at least 0.05. It maybe more preferred that the greater of |x2−x1| and |y2−y1| is at least 0.1. See, e.g., J. A. Dobrowolski et al., "Research on thin film anticounterfeiting coatings at the National Research Council of Canada," Applied Optics, 28(14):2702–2717 (1989); and Shaw et al. '895.

The layers used in the reflective coating 20 to form the spacer layer 24 can be disposed in optical association with the layer of microspheres 12 using techniques now known or later developed which are suitable for disposing layers of materials that have desired thicknesses. Such techniques can include solvent-borne coating techniques, liquid reactive coating techniques, extrusion coating techniques, gravure coating techniques, physical and chemical vapor deposition techniques, plasma deposition techniques, film lamination techniques, and the like.

Exemplary techniques of coating polymer layers include the pre-polymer vapor deposition methods taught in U.S. Pat. No. 6,503,564 (Fleming et al. '564). Briefly, these methods involve condensing a pre-polymer vapor onto a structured substrate, and curing the material on the substrate. These methods can be used to form polymer coatings that have controlled chemical composition and that preserve the underlying profile of the structured substrate. Multiple coatings of the same or different material can be applied in this fashion to form a spacer layer in a reflective coating.

Figure 3:
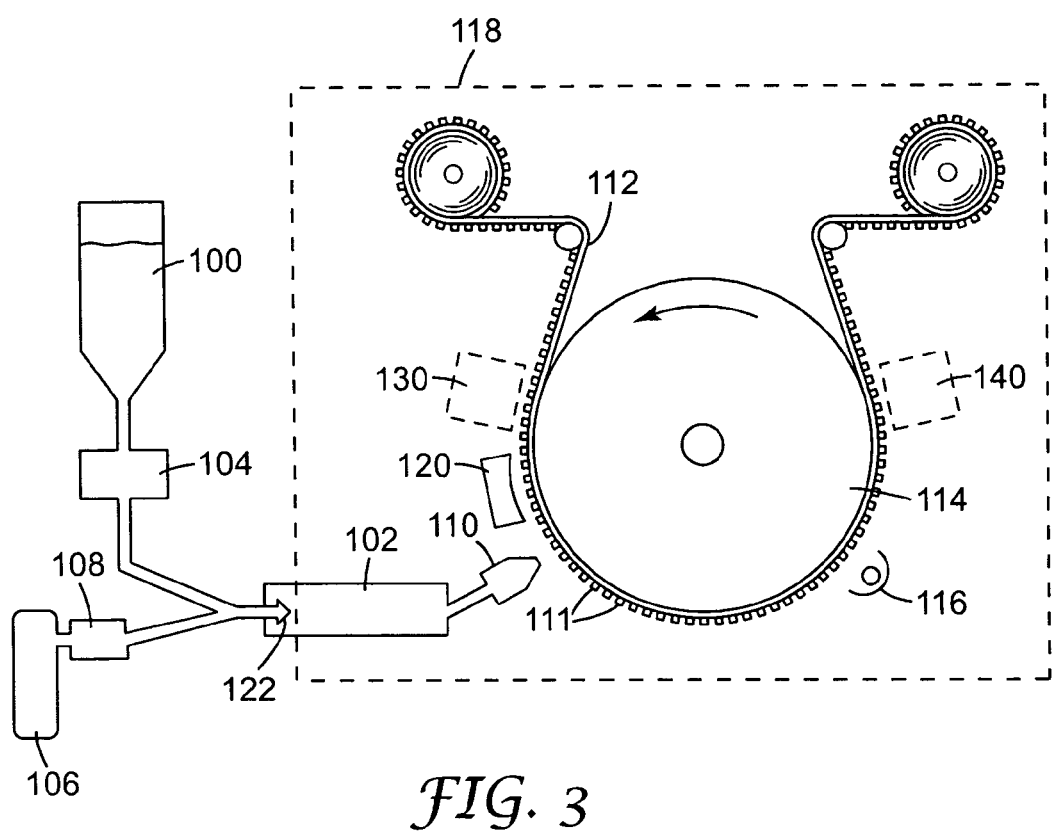
FIG. 3 is a schematic diagram of one embodiment of a coating apparatus.

Preferred methods of making reflective coatings in optical association with the layer of microspheres of the color shifting retroreflective articles of the present disclosure can include aspects of the coating process shown in FIG. 3. The process can be performed at atmospheric pressure, optionally enclosing the coating region in a chamber 118 (e.g., for providing a clean environment, for providing an inert atmosphere, or for other such reasons), or at reduced pressure where chamber 118 is a vacuum chamber.

As shown in FIG. 3, color shifting retroreflective article 112 is provided in 25 chamber 118. Color shifting retroreflective article 112 may include any suitable color shifting retroreflective article as described herein. Color shifting retroreflective article 112 may include a layer of microspheres attached to a carrier film as is described, e.g., in U.S. Pat. No. 6,355,302 (Vandenberg et al.). The layer of microspheres may include microspheres 111.

In some embodiments, article 112 may include a first reflective layer (e.g., first reflective layer 22 of FIG. 2) formed prior to placement of the color shifting retroreflective article 112 in the chamber 118. Alternatively, an optional deposition station 130 (e.g., a metallization station) may be included in chamber 118 to deposit a first reflective layer adjacent the layer of microspheres using any suitable technique, e.g., vacuum metallization, sputtering, evaporation, chemical vapor deposition (CVD), and plasma enhanced CVD.

Prior to deposition of the first reflective layer, the layer of microspheres may be treated to promote adhesion of the first reflective layer to the layer of microspheres. Any suitable technique may be used to treat the layer of microspheres, e.g., plasma treatment, corona treatment, flame treatment, or UV/ozone treatment. Further, one or more intermediate layers may be formed on the layer of microspheres prior to deposition of the first reflective layer as is further described herein.

A spacer layer (e.g., spacer layer 24 of FIG. 2) is then deposited on the first reflective layer using coating material 100. Coating material 100, supplied in the form of a liquid monomer or pre-polymer, can be metered into evaporator 102 via pump 104. As described in detail herein, the coating material 100 can be evaporated by one of several techniques, including flash evaporation and carrier gas collision vaporization. It may be preferred that the coating material 100 is atomized into fine droplets through optional nozzle 122, the droplets being subsequently vaporized inside evaporator 102. Optionally, a carrier gas 106 can be used to atomize the coating material 100 and direct the droplets through nozzle 122 into evaporator 102. Vaporization of the liquid coating material 100, or droplets of the liquid coating material 100, can be performed via contact with the heated walls of the evaporator 102, contact by the optional carrier gas 106 (optionally heated by heater 108), or contact with some other heated surface. Any suitable operation for vaporizing the liquid coating material 100 is contemplated for use in this disclosure.

After vaporization, the coating material 100 can be directed through a coating die 110 and onto the first reflective layer of color shifting retroreflective article 112. A mask (not shown) can optionally be placed between the coating die 110 and the color shifting retroreflective article 112 to coat selected portions of the first reflective layer. Optionally, the surface of the first reflective layer can be pretreated using an electrical discharge source 120, such as a glow discharge source, silent discharge source, corona discharge source, or the like. The pretreatment step is optionally performed to modify the surface chemistry, for example, to improve adhesion of coating material 100 to the first reflective layer, or for other such purposes. In addition, the layer of microspheres, the surface of the first reflective layer, or both can optionally be pretreated with an adhesion promoter, as discussed herein.

It may be preferred that the color shifting retroreflective article 112 is maintained at a temperature at or below the condensation temperature of the monomer or pre-polymer vapor exiting the coating die 110. Color shifting retroreflective article 112 can be placed on, or otherwise disposed in temporary relation to, the surface of drum 114. The drum 114 allows the retroreflective article 112 to be moved past the coating die 110 at a selected rate to control the layer thickness. The drum 114 can also be maintained at a suitable bias temperature to maintain the retroreflective article 112 at or below the pre-polymer vapor's condensation temperature. After condensing the curing material 100 on the article 112, the liquid monomer or pre-polymer layer can be cured to form the spacer layer. Curing the material generally involves irradiating the material on the substrate using visible light, ultraviolet radiation, electron beam radiation, ion radiation or free radicals (as from a plasma), or heat or any other suitable technique. When the article 112 is mounted on a rotatable drum 114, a radiation source 116 preferably is located downstream from the monomer or pre-polymer vapor source so that the coating material 100 can be continuously applied and cured on the surface of the first reflective layer. Multiple revolutions or passes of the substrate can be employed to successively deposit and cure monomer vapor onto layers that were deposited and cured during previous revolutions. In some embodiments, the spacer layer may be cured after the second reflective layer is deposited on the spacer layer as is further described herein.

After the coating material 100 is cured by radiation source 116 to form the spacer layer, the color shifting retroreflective article 112 passes an optional deposition station 140 (e.g., a metallization station) where a second reflective layer (e.g., second reflective layer 26 of FIG. 2) may be deposited on the spacer layer using any suitable technique, e.g., vacuum metallization, sputtering, evaporation, chemical vapor deposition (CVD), and plasma enhanced CVD. Alternatively, the second reflective layer may be deposited by reversing drum 114 and employing deposition station 130. The second reflective layer may also be deposited after the color shifting retroreflective article 112 has been removed from the chamber 118. After depositing the second reflective layer, a binder layer or a substrate may be formed on the reflective coating opposite the layer of microspheres as is further described herein.

Those skilled in the art will appreciate that the apparatus shown in FIG. 3 may be modified to apply the first or second reflective layers as a stack of layers each containing one or more inorganic or organic materials, with two or more such layers having refractive indices that differ sufficiently to reflect light. Those skilled in the art will also appreciate that the apparatus shown in FIG. 3 may be modified to apply additional coating materials as desired. For example, inorganic, organometallic, or non-polymeric layers may be deposited using suitable methods, now known or later developed, including sputtering, chemical vapor deposition, electroplating, condensing from a solvent, and other such methods. These additional layers may be deposited directly on the layer of microspheres before the first reflective layer is deposited, after the first reflective layer is deposited, or after the spacer layer is deposited.

In some embodiments, an adhesion promoter can be coated between the layer of microspheres and the reflective coating or between the first reflective layer and the spacer layer. Adhesion promoters can be selected to improve interlayer adhesion, e.g., between the reflective coating and the layer of microspheres or between the first reflective layer and the spacer layer. For example, a silane coupling agent can be used that promotes adhesion between polymer layers of the multilayer reflective coatings of the present disclosure and optical elements which can be, for example, glass or ceramic microspheres. Exemplary silane coupling agents include aminopropyltriethoxysilane, glycidoxypropyltrimethoxysilane, methacryloxypropyltrimethoxysilane, and vinyltrimethoxysilane. Also, titanate coupling agents can be used as adhesion promoters, examples of which include isopropyl tri(dioctyl)phosphato titanate, dimethacryloxoethylene titanate, and titanium(tetraisopropoxide). Silazanes such as hexamethyldisilazane can also be used as adhesion promoters. Examples of silane coupling agents are disclosed in U.S. Pat. No. 5,200,262 (Li).

Apparatuses suitable for carrying out various aspects of the method illustrated in FIG. 3 are described, for example, in Fleming et al. '564 and in U.S. Pat. No. 6,012,647 (Lyons et al. '647); U.S. Pat. No. 6,045,864 (Lyons et al. '864); U.S. Pat. No. 4,722,515 (Ham); U.S. Pat. No. 4,842,893 (Yializis et al. '893); U.S. Pat. No. 4,954,371 (Yializis '371); U.S.

Pat. No. 5,097,800 (Shaw et al. '800) and U.S. Pat. No 5,395,644 (Affinito). Apparatuses and portions of apparatuses that may be suitable for carrying out these and other aspects of the method illustrated in FIG. 3 are described in more detail in the cited documents.

Exemplary monomers and oligomers suitable for use in the process shown in FIG. 3 include acrylates, methacrylates, acrylamides, methacrylamides, vinyl ethers, maleates, cinnamates, styrenes, olefins, vinyls, epoxides, silanes, melamines, hydroxy functional monomers and amino functional monomers. Suitable monomers and oligomers can have more than one reactive group, and these reactive groups may be of different chemistries on the same molecule. Pre-polymers can be mixed to achieve a broad range of optical properties such as a desired index of refraction in one or more layers of the reflective coating. It can also be useful to coat reactive materials from the vapor phase onto a substrate already having chemically reactive species on its surface, examples of such reactive species including monomers, oligomers, initiators, catalysts, water, or reactive groups such as hydroxy, carboxylic acid, isocyanate, acrylate, methacrylate, vinyl, epoxy, silyl, styryl, amino, melamines and aldehydes. These reactions can be initiated thermally or by radiation curing, with initiators and catalysts as appropriate to the chemistry or, in some cases, without initiators or catalysts. When more than one pre-polymer starting material is used, the constituents may be vaporized and deposited together, or they can be vaporized from separate evaporation sources.

The deposited pre-polymer materials can be applied in a substantially uniform, substantially continuous fashion, or they can be applied in a discontinuous manner, for example, as islands that cover only a selected portion or portions of the optical elements. Discontinuous applications can be provided in the form of characters, numerals, or other indicia by using, for example, a mask or other suitable techniques, including subsequent removal of undesired portions.

Pre-polymer vapor deposition is particularly useful for forming thin films having a thickness of about 0.01 μm to about 50 μm. Thicker layers can be formed by increasing the exposure time of the substrate to the vapor, by increasing the flow rate of the fluid composition to the atomizer, or by exposing the substrate to the coating material over multiple passes. Increasing the exposure time of the retroreflective article to the vapor can be achieved by adding multiple vapor sources to the system or by decreasing the speed at which the article travels through the system. Layered coatings of different materials can be formed by sequential coating depositions using a different coating material with each deposition, or by simultaneously depositing materials from different sources displaced from each other along the substrate travel path.

A variety of techniques may be used to produce a spacer layer that includes a non-uniform thickness for each of several microspheres of the color shifting articles described herein. One such exemplary technique is to condense different amounts of monomer in different thicknesses directly. Such techniques are described, e.g., in Shaw et al. '895. Alternatively, a uniform thickness of monomer may be deposited in all areas and then the spacer layer thickness may be shrunk to different extents in different areas for each microsphere. By controlling the degree of polymerization of the spacer layer, the thickness of the spacer layer may be controlled. Such techniques are also further described, e.g., in Shaw et al. '895.

Table I lists a few examples of polymer and pre-polymer materials that can be disposed to form the spacer layer using various methods. The known refractive index of the monomer or the polymer made from the monomer is given for each material. Different refractive indices can be achieved by choosing these or other starting materials that either have a desired refractive index or that can be mixed with one or more other materials to obtain a desired refractive index. Other polymers that may be suitable are disclosed, for example, in Fleming et al. '564.

TABLE I

| Polymer or pre-polymer material | Supplier of monomer | Refractive index (monomer) | Refractive index (polymer) |
|---|---|---|---|
| Poly(vinyl naphthalene) | Aldrich (Milwaukee, WI) | — | 1.6818 |
| Poly(styrene) | Aldrich | 1.547 | 1.592 |
| Poly(lauryl methacrylate) | Aldrich | 1.445 | 1.474 |
| Poly(trimethyl cylclohexyl methacrylate) | Aldrich | 1.456 | 1.485 |
| Poly(pentafluoro-styrene) | Aldrich | 1.406 | — |
| Poly(trifluoroethyl methacrylate) | Aldrich | 1.361 | 1.437 |
| Poly(dibromopropene) | Aldrich | 1.5573 | — |
| Poly(benzyl methacrylate) | Aldrich | 1.512 | 1.568 |
| Poly(ethylene glycol phenyl ether acrylate) | Aldrich | 1.518 | — |
| Poly(pentadecafluoro-octyl acrylate) | 3M (St. Paul, MN) | 1.328 | 1.339 |
| Poly(ortho-sec-butyl dibromophenyl acrylate) | 3M | 1.562 | 1.594 |
| Ethoxylated trimethylol-propane triacrylate | Sartomer (Exton, PA) | 1.4695 | — |
| Tris(2-hydroxy ethyl) isocyanurate triacrylate | Sartomer | 1.4489 | — |
| Ethoxylated Bisphenol A diacrylate | Sartomer | 1.4933 | — |
| 1,6 hexanediol diacrylate | Sartomer | 1.456 | — |
| Isooctyl acrylate | Sartomer | 1.4346 | — |
| Isobornyl acrylate | Sartomer | 1.4738 | — |
| Tripropylene glycol diacrylate | Sartomer | 1.44 | |

The disclosed color shifting retroreflective articles may be used in a variety of applications. For example, the articles can provide decorative effects for use in vehicular identification badges, advertising or signage. The articles can be affixed to substrates such as passports, driver licenses or identification cards to provide evidence of tampering or security authentication. The articles can provide positional information based on the color of retroreflected light. The articles can have other uses that will be apparent to those skilled in the art whenever a visually perceptible change in the color of retroreflected light is desired for informational or other purposes.

The invention will now be described with reference to the following non-limiting example, in which all parts and percentages are by weight unless otherwise indicated.

EXAMPLE

High index of refraction glass beads having an index of refraction of 1.93 and a 60 μm nominal diameter were partially embedded into a polyethylene layer on a polyester film carrier forming a beadcoat carrier having a layer of microspheres. A reflective coating was formed on the layer of microspheres in three separate coating passes. Between each coating pass the chamber was opened to the atmosphere. The beadcoat carrier was loaded into a vacuum chamber and the pressure was reduced to $2.7 \times 10^{-5}$ torr. The beadcoat was first plasma treated with nitrogen plasma at 100 watts power, then a 4 nm (target thickness) chrome layer was sputter coated using 12,250 watts power with an argon gas to form a semitransparent first reflective metal layer. The target line speed was about 15 meters/minute (50 feet/minute), and the actual speed was about 12 meters/minute (40 feet/minute) due to apparent slippage. The vacuum chamber was opened to permit inspection of the beadcoat carrier with chrome first reflective metal layer. The carrier was then reloaded into the vacuum chamber and the pressure reduced to $3.5 \times 10^{-6}$ torr. A 600 nm acrylate spacer layer was deposited at a web speed of 50 feet/minute. The acrylate spacer layer was formed from a mixture containing 48.5% IRR-214 cyclic diacrylate from UCB Chemicals, 48.5% lauryl acrylate, and 3% EBECRYL™ 170 acrylated acidic compound from UCB Chemicals. In a third pass, 30 nm of aluminum was vapor deposited from resistively heated evaporative boats to form the second reflective metal layer.

A polyurethane adhesive binder layer was applied to the color shifting retroreflective article positioned on the beadcoat carrier. The adhesive binder layer was made by mixing 10.6 grams CAPA™ 720 (now CAPA 7201A) block copolymer of epsilon-caprolactone and poly (1,4-butyleneglycol) from Solvay Chemicals; 18.0 grams SYN FAC™ 8009 alkoxylate from Milliken Corporation; 3.4 grams PERSTORP™ TP30 acrylic polyol from Perstorp Inc.; 3 drops dibutyltin dilaurate; 60.4 grams of a polyurethane prepolymer made by reacting MONDUR™ ML diphenylmethane diisocyanate from Bayer Corp. with CAPA 720 block copolymer in a 4:1 mole ratio; and 4.6 grams of a silane adhesion promoter. The silane adhesion promoter was made from a mixture of 2.44 grams of a diethoxy silane synthesized by reacting 3.05 parts A074 aminopropylmethyl diethoxy silane from Witco Corp. and 1.625 parts propylene carbonate, and 2.46 grams of a triethoxy silane synthesized by reacting 3.63 parts A1100 aminopropyl triethoxy silane from Witco Corp. and 1.675 parts propylene carbonate. The resulting reactive polyurethane mixture was coated with a notch bar coater set at a 0.15 mm (6 mil) gap and cured 3 minutes at 66° C., then a 100% polyester fabric substrate was applied on the semi-cured adhesive and cured at 10 minutes at 104° C. After 4 weeks, the polyester film substrate was stripped away to yield the exposed lens color shifting retroreflective article. The material had a grayish blue-green appearance under ambient light conditions. In retroreflection, the material appeared blue or green and shifted to green or blue as the orientation of the sample shifted. The coefficient of retroreflection (Ra) was 214 at a 0.20 observation angle and −4° entrance angle. After 25 home laundering cycles this sample retained more than 50% of its original Ra.

Figure 4:
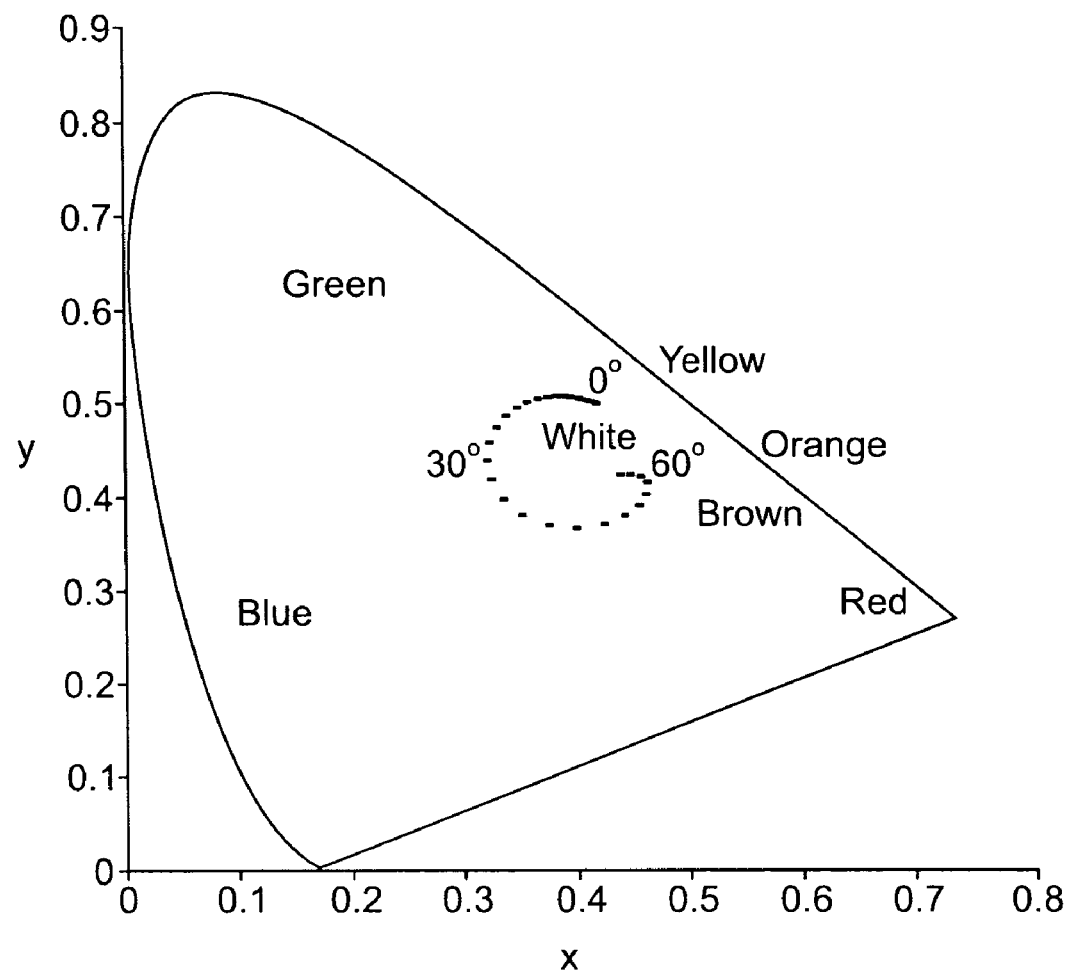
FIG. 4 is a chromaticity diagram using CIE x-y chromaticity coordinates for the color shifting retroreflective article of the Example.

FIG. 4 is a chromaticity diagram using CIE x-y chromaticity coordinates for the color shifting retroreflective article of the Example. An area of about 21 cm by 24 cm of the color shifting retroreflective article was examined using the CIE 2° observer and illuminant A. The observation angle was fixed at 0.33°, which is the usual value for night time color measurements, and the entrance angle was changed in 2° steps from 0 to 60°. The resultant CIE color coordinates for night time color vary in a smooth, continuous spiral-like curve from yellow-green, green, blue, violet, purple, pink, orange, and finally white. These values are actually averages of several colors shifting because of the variation over the area of the sample that was examined at one time.

Figure 5:
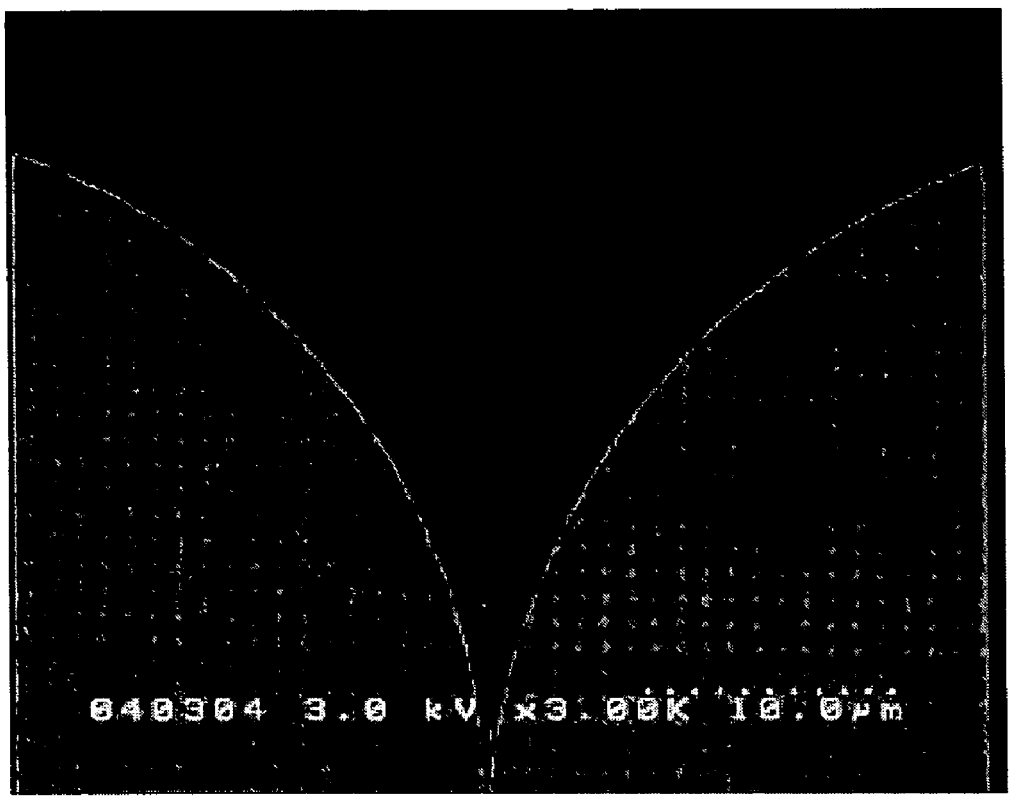
FIG. 5 is a photograph of a portion of the color shifting retroreflective article of the Example taken using scanning electron microscopy.

FIG. 5 is a photograph of a portion of the color shifting retroreflective article of the Example taken using scanning electron microscopy. A cross-section of the coated glass microspheres was examined with a scanning electron microscope. FIG. 5 shows the reflective coating formed on the layer of microspheres. The coating is very thin, contours the structure of the surface of the beads, and approximates the target thickness. As can be seen in FIG. 5, the reflective coating includes a non-uniform thickness associated with each microsphere.

All references cited herein are expressly incorporated herein by reference in their entirety into this disclosure. Illustrative embodiments of this disclosure are discussed and reference has been made to possible variations within the scope of this disclosure. These and other variations and modifications in the disclosure will be apparent to those skilled in the art without departing from the scope of the disclosure, and it should be understood that this disclosure is not limited to the illustrative embodiments set forth herein. Accordingly, the invention is not to be limited only by the claims provided below.

We claim:

1. A color shifting retroreflective article, comprising:
a layer of microspheres; and
a reflective coating disposed in optical association with the layer of microspheres, wherein the reflective coating comprises an at least partially transparent spacer layer disposed between a semitransparent first reflective layer and a second reflective layer, and at least one layer of the reflective coating comprises a non-uniform thickness associated with each of a plurality of microspheres such that light incident on the article from a first direction is retroreflected at a first color and light incident on the article from a second direction is retroreflected at a second color visibly different from the first color.

2. The article of claim 1, wherein the reflective coating consists essentially of the first reflective layer, the spacer layer, and the second reflective layer.

3. The article of claim 1, wherein the non-uniform thickness associated with each of the plurality of microspheres exhibits a thickness gradient.

4. The article of claim 1, wherein the spacer layer comprises the non-uniform thickness.

5. The article of claim 1, wherein the first color and second color are characterized by CIE chromaticity coordinates $(x_1, y_1)$, $(x_2, y_2)$, respectively, wherein the first direction and the second direction differ by 30°, and further wherein the greater of $|x_2-x_1|$ and $|y_2-y_1|$ is at least 0.05.

6. The article of claim 5, wherein the greater of $|x_2-x_1|$ and $|y_2-y_1|$ is at least 0.1.

7. The article of claim 5, wherein the first direction is substantially normal to the layer of microspheres.

8. The article of claim 1, wherein the article exhibits an angular-dependent shift in both the color and intensity of retroreflected light.

9. A color shifting retroreflective article, comprising:
a layer of microspheres; and
a reflective coating disposed in optical association with the layer of microspheres, wherein the reflective coating comprises:
a semitransparent first reflective layer adjacent the layer of microspheres;
an at least partially transparent spacer layer adjacent the first reflective layer; and
a second reflective layer adjacent the spacer layer such that the spacer layer is between the first and second reflective layers;
wherein the reflective coating reflects visible light non-uniformly, and a predetermined first area of the reflective coating associated with each microsphere of at least a plurality of microspheres comprises a first thickness and a predetermined second area of the reflective coating associated with each microsphere of at least a plurality of microspheres comprises a second thickness different from the first thickness.

10. The article of claim 9, wherein the article retroreflects colored light when illuminated at normal incidence with white light.

11. The article of claim 9, wherein the article exhibits an angular-dependent shift in both the color and intensity of retroreflected light.

12. A method for making a color shifting retroreflective article, comprising:
providing a layer of microspheres; and
forming a reflective coating in optical association with the layer of microspheres, wherein forming the reflective coating comprises:
depositing a semitransparent first reflective layer adjacent the layer of microspheres;
depositing an at least partly transparent spacer layer on the first reflective layer; and
depositing a second reflective layer on the spacer layer;
wherein the reflective coating is formed to provide for each of a plurality of microspheres a non-uniform thickness in at least one of the respective layers of the reflective coating such that light incident on the article from a first direction is retroreflected at a first color and light incident on the article from a second direction is retroreflected at a second color visibly different from the first color.

13. The method of claim 12, wherein depositing the spacer layer comprises:
condensing a pre-polymer vapor on the first reflective layer; and
curing the condensed pre-polymer vapor.

14. The method of claim 13, wherein depositing the spacer layer further comprises vaporizing a liquid composition containing a monomer or an oligomer to form the pre-polymer vapor.

15. The method of claim 14, wherein vaporizing the liquid composition comprises flash evaporating the liquid composition to form the pre-polymer vapor.

16. The method of claim 14, wherein vaporizing the liquid composition comprises atomizing the liquid composition into droplets and vaporizing the droplets.

17. The method of claim 13, wherein curing the condensed pre-polymer vapor comprises exposing the condensed pre-polymer vapor to radiation.

18. The method of claim 13, wherein curing the pre-polymer vapor occurs simultaneously with condensing the pre-polymer vapor.

19. The method of claim 13, wherein the pre-polymer vapor includes one or more of acrylates, methacrylates, acrylamides, methacrylamides, vinyl ethers, maleates, cinnamates, styrenes, olefins, vinyls, epoxides, silanes, melamines, hydroxyl functional monomers or amino functional monomers.

20. The method of claim 12, wherein the method further comprises forming a binder layer on the reflective coating opposite the layer of microspheres.

* * * * *

UNITED STATES PATENT AND TRADEMARK OFFICE
CERTIFICATE OF CORRECTION

| | | |
|---|---|---|
| PATENT NO. | : 7,140,741 B2 | |
| APPLICATION NO. | : 11/024201 | |
| DATED | : November 28, 2006 | |
| INVENTOR(S) | : Robert J. Fleming | |

It is certified that error appears in the above-identified patent and that said Letters Patent is hereby corrected as shown below:

<u>Title Page, Item (56) Col. 2 (Other Publications)</u>
Line 1, Delete ""Reasearch" and insert -- "Research --, therefor.
Line 2, Delete "Reasearch" and insert -- Research --, therefor.

<u>Title Page, Item (56) Page 2 Co. 2 (Other Publications)</u>
Line 4, Delete "Folms" and insert -- Films --, therefor.

<u>Column 3,</u>
Lines 5-11, Delete "The reflective coating……………………….from the first thickness." and insert the same after, "layers." on line 4.
Line 18 (approx.), Delete "DRAWING" and insert -- DRAWINGS --, therefor.

<u>Column 8,</u>
Line 16, Delete "maybe" and insert -- may be --, therefor.
Line 17, Delete "maybe" and insert -- may be --, therefor.
Line 54, After "in" delete "25".

<u>Column 8-9,</u>
Lines 61-67 (Col. 8) – 1-3 (Col. 9), Delete "In some embodiments,………………plasma enhanced CVD." and insert the same after "111." on line 60.

<u>Column 12,</u>
Line 19 (approx.), After "Poly(trimethyl" delete "cylclohexyl" and insert -- cyclohexyl --, therefor.

<u>Column 13,</u>
Line 47, Delete "0.20" and insert -- 0.2° --, therefor.

UNITED STATES PATENT AND TRADEMARK OFFICE
CERTIFICATE OF CORRECTION

PATENT NO. : 7,140,741 B2
APPLICATION NO. : 11/024201
DATED : November 28, 2006
INVENTOR(S) : Robert J. Fleming It is certified that error appears in the above-identified patent and that said Letters Patent is hereby corrected as shown below:

<u>Column 14,</u>
Line 44, In Claim 5, delete "$|y_2-y_1|$is" and insert -- $|y_2-y_1|$ is --, therefor.

Signed and Sealed this

Twenty-fourth Day of April, 2007

JON W. DUDAS
*Director of the United States Patent and Trademark Office*